June 14, 1960 H. A. SCHNEIDER 2,941,091

PULSE SELECTOR CIRCUITS

Filed Sept. 10, 1953 2 Sheets-Sheet 1

INVENTOR
H. A. SCHNEIDER
BY [signature]
ATTORNEY

June 14, 1960 H. A. SCHNEIDER 2,941,091

PULSE SELECTOR CIRCUITS

Filed Sept. 10, 1953 2 Sheets-Sheet 2

INVENTOR
H. A. SCHNEIDER
BY
James D. Falk
ATTORNEY 2,941,091

PULSE SELECTOR CIRCUITS

Herbert A. Schneider, Coytesville, N.J., assignor to Bell Telephone Laboratories, Incorporated, New York, N.Y., a corporation of New York Filed Sept. 10, 1953, Ser. No. 379,451

4 Claims. (Cl. 307—88.5)

This invention relates to electrical circuits and more particularly to such circuits for selecting and transmitting only one or more particular pulses from a train of pulses.

In computer and similar electrical systems wherein information is transferred in the form of pulses and pulse trains, it is often desirable to choose a particular pulse or pulses from a train of pulses and to apply this particular pulse or pulses to specific equipment. Thus, in certain systems, information is represented by a given number of pulses in a train which information is to be stored in a first group of circuit elements or registers. After this information has been stored, the pulses are to be transmitted to another group of elements or registers for storage. The shifting of the pulses between these register elements is to take place on the occurrence of a particular pulse in the train which represents the conclusion of a distinct item of information. It is therefore desirable to be able to select from the train this particular pulse to apply it to the control circuits.

Priorly various active elements, such as gas or vacuum tubes, and counter circuits have been employed to attain pulse selection. It is, however, desirable to reduce the use of active elements, which both have limited life and require distinct power supplies. It is further desirable to utilize circuit components which are small in volume and light in weight so that the overall size of the equipment in systems of these kinds may be kept at a minimum.

It is an object of this invention to provide improved pulse selection circuits for the selection of one or more pulses from a train of pulses for transmission to additional circuitry.

More specifically objects of this invention include providing improved circuits for the selection from a train of pulses of only the first pulse, only the last pulse, only the first *n* pulses or only the *n*th pulse.

Further objects of this invention include the provision of such improved circuitry utilizing passive elements having long lives, minimal power requirements, and capable of being mounted in very compact units.

These and other objects of this invention are attained in certain specific embodiments of this invention by utilizing two unidirectional current elements in series to which elements the train of pulses is applied; these elements, which both allow passage of pulses of the same polarity, may be logic circuits, such as OR circuits, or may be amplifiers. A delay line, terminated in a short circuit, is connected to the conducting path between the two elements and the delay of this line is related to the number of pulses to be selected from the train of pulses. A delay line terminated in a short circuit causes a pulse to be reflected back to its input which is of the opposite polarity to the applied pulse and which is delayed by twice the delay of the short circuited delay line.

If the first pulse only is to be transmitted through the circuit, the delay of the delay line is advantageously a half-digit, assuming the pulses occur consecutively at one-digit intervals. The first pulse will be transmitted through the two unidirectional elements and will also be transmitted down the delay line and reflected back from it. When the second pulse in the train arrives at the input of the delay line, the reflected pulse will be also present and will be of the opposite polarity due to the reflection. These two substantially equal and opposite pulses will be applied to the second unidirectional element and will tend to cancel each other, so that no output appears at the second unidirectional element. Advantageously this element is biased so that no output appears even though the second pulse may be slightly larger than the reflected pulse, due to attenuation of the reflected pulse in the delay line.

This second pulse is also applied to the delay line and reflected back one digit later so as to be coincident with the third pulse of the train. In this manner each subsequent pulse is cancelled by the prior reflected pulse until the end of the pulse train, at which time just the last reflected pulse is applied to the second unidirectional element. As the polarity of the reflected pulse is opposite to that for which the element is poled, the pulse is blocked.

If the first *n* pulses are to be transmitted through the circuit, the short circuited delay line has $n/2$ digits of delay, so that the first reflected pulse does not appear at the input of the delay line until after the occurrence of *n* pulses.

If the last pulse only is to be selected, an inverting transformer is positioned between the terminals of the delay line and the second unidirectional current element so that the first pulse, which is not cancelled by a reflected pulse, is blocked by the second unidirectional element and the last reflected pulse only is transmitted through the element.

By combining the above circuits any particular pulse of a train may be selected and transmitted, as described further below.

It is a feature of this invention that a short circuited delay line be connected to the conducting path between an output unidirectional current element and a pulse train source to select any one or more pulses of a train of pulses for transmission to additional circuitry attached to the unidirectional current element.

It is a further feature of certain embodiments of this invention that an inverting transformer or other polarity reversing element be positioned between the short circuited delay line and the unidirectional current element so that only pulses that have been passed down the delay line and reflected back can be transmitted through the unidirectional current element.

In accordance with another feature of this invention, the unidirectional current element may comprise an amplifier circuit, such as a transistor amplifier, the amplifier being biased so as not to allow an output to appear if the pulse reflected by the short circuited delay line does not entirely cancel the pulse being transmitted directly, due to attenuation of the reflected pulse in the delay line.

It is a still further feature of this invention that three unidirectional current elements may be employed with short circuited delay lines connected to the conducting paths between the elements to enable the selection of a particular one or more pulses in the middle of a train of pulses.

These and various other features of this invention may be fully understood from consideration of the following detailed description and the accompanying drawing, in which.

Figure 1:
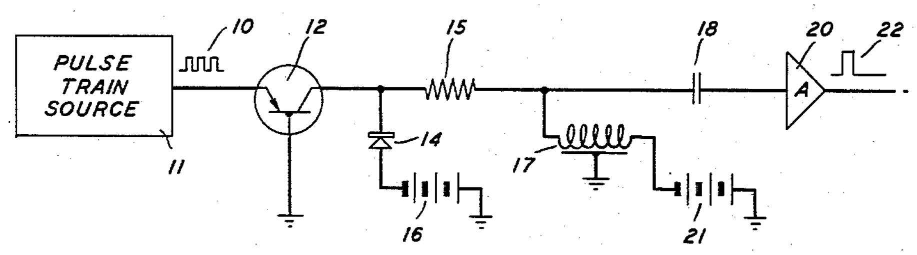
Fig. 1 is a schematic circuit representation of one specific illustrative embodiment of this invention whereby the first pulse only of a train of pulses is selected.

Turning now to Fig. 1 of the drawing, a pulse train 10 is transmitted by some pulse train source 11 and applied to an input or driving amplifier 12 of the selector circuit. This amplifier 12 is advantageously a pulse reshaping transistor amplifier of the types known in the art. While the driving amplifier 12 is shown distinct from the pulse train source 11, it may advantageously be included in the source. The pulse train 10 is applied to the emitter of the transistor and the output taken from the collector which has a reverse bias applied to it, by a source 21, discussed below; in one specific illustrative embodiment wherein the transistor was of N type, this bias was −8 volts. The pulse train 10 is then applied, through a resistor 15, further described below, both to the input of a delay line 17 and, through a condenser 18, to an output amplifier 20, which may also advantageously be of the transistor type.

Delay line 17 may be of any of the known types of electrical delay lines having inductive and capacitance members for each section of the line. The inductive members may be coils wound around an insulating rod and the capacitances may comprise button condensers connected between a turn of the coil and ground. Such a delay line is shown at page 214 of "Components Handbook," J. F. Blackburn, Ed. (M.I.T. Radiation Laboratory Series, vol. 17, 1949). Its one input terminal, connected to the first coil, is connected to the conductivity path. By connecting the end wire of the last coil of the delay line, which is one output terminal, to ground, or to ground through a voltage source having negligible impedance, the delay line is effectively terminated in a short circuit. The other input terminal not connected to the conductivity path and the other output terminal are also grounded.

The delay line 17 in accordance with this specific illustrative embodiment has a delay equal to one-half the interval between successive pulses in the pulse train 10, i.e., has a one-half digit delay. The delay line is effectively terminated in a short circuit by being connected to ground through a low impedance voltage supply 21 which applies a −8 volt bias to the termination of the delay line 17 to provide a collector potential for the transistor amplifier 12. Diode 14 provides a low impedance path for the reflected pulses during the time that the transistor 12 is not fired and assures that the voltage on the collector of the transistor does not exceed the voltage of source 16 which is also −8 volts.

Figure 2:
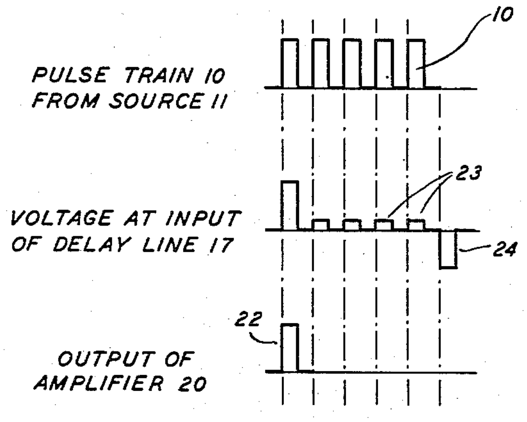
Fig. 2 is a pulse diagram for the embodiment of Fig. 1.

The first pulse of the pulse train 10 passes through both the driving and output amplifiers 12 and 20, appearing at the output lead of output amplifier 20 as the single output pulse 22. This first pulse is of course also applied to the input of the delay line 17, travels down the delay line in one-half a digit, is reflected back along the delay line by the short circuit termination of the delay line, and reappears, inverted, at the input of the delay line after one digit. The first reflected pulse thus appears at the input of the delay line at the instant that the second pulse of the pulse train 10 is at the input of the delay line. The second positive pulse from the driving amplifier 12 is therefore balanced out or eliminated by the first reflected pulse from the delay line 17, so that substantially no voltage is applied to the output amplifier 20, as seen in Fig. 2. Actually, however, since the delay line will have some attenuation, the reflected negative pulses are always slightly smaller than the positive pulses of the pulse train. Consequently small positive pulses 23, seen in Fig. 2, result from this combination. Advantageously, the output amplifier 20 is so biased that the amplitude of these pulses 23 is below the level required to trigger the amplifier.

In this manner each positive pulse of the pulse train is applied to the input of the delay line, reflected back inverted, and combined with the succeeding positive pulse to effectively cancel it out. The last pulse of the pulse train is itself in this manner cancelled and not applied to the output amplifier 20; the last reflected pulse 24, seen in Fig. 2, is of course not reflected, but is applied to the output amplifier 20. However, as the output amplifier 20 is a unidirectional current element, the negative reflected pulse 24 is blocked and does not appear at the output of the amplifier. Thus the only output from the amplifier 20 is the first pulse of the pulse train 10.

While amplifiers 12 and 20 have been depicted and described, it is to be understood that they may be unidirectional current elements. Thus these elements may be logic OR circuits; however, by employing amplifiers the pulses may be reshaped, thus providing pulses of constant amplitude and duration. The resistor 15 and diode 14 are advantageously included in the circuit to prevent the transmission of reflected pulses from the delay line to the amplifier 12 and the secondary reflections of the pulses from the delay line by the amplifier 12 back to the delay line input. In this manner the pulse selection is essentially independent of the output impedance of the driving amplifier 12.

Figure 4:
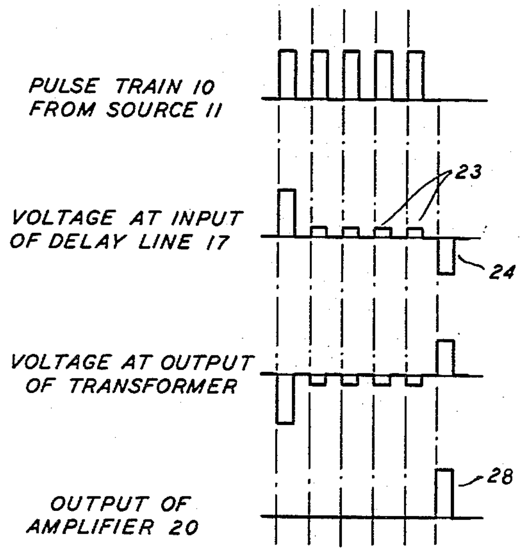
Fig. 4 is a pulse diagram for the embodiment of Fig. 3.
Figure 3:
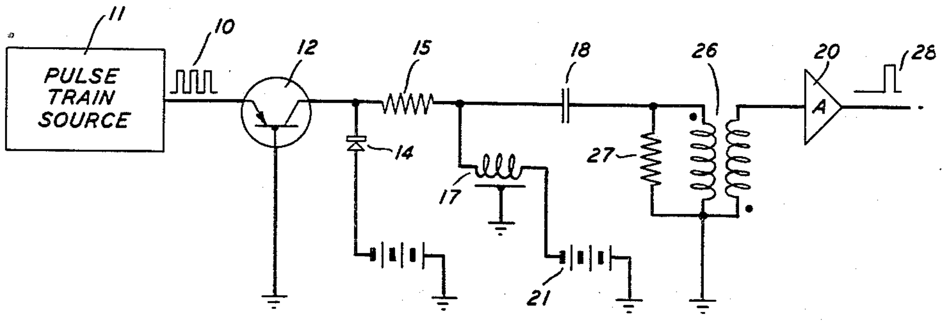
Fig. 3 is a schematic circuit representation of one specific illustrative embodiment of this invention whereby the last pulse only of a train of pulses is selected.

Turning now to Fig. 3 there is depicted another illustrative embodiment of this invention wherein the last pulse of the train of pulses is selected. In this embodiment there is introduced in the conducting path between the amplifiers 12 and 20, and specifically between the input of the one-half digit delay line 17 and the amplifier 20, an inverting transformer 26, advantageously having a resistor 27 across its input winding. The transformer 26, which may have a 1:1 turns ratio, serves to invert the polarity of the pulses applied to it. Thus, as seen in Fig. 4, the first positive pulse of the pulse train, which is not cancelled out by a reflected pulse from delay line 17, is inverted and applied as a negative pulse to the output amplifier 20. As amplifier 20 is a unidirectional current element which will only transmit positive current or voltage pulses, this pulse is blocked. The intermediate pulses are substantially cancelled, as described above, by the prior reflected pulse from the delay line; as the transformer converts all positive signals to negative ones, which do not trigger the output amplifier 20, no bias need be specially applied to the amplifier 20 to prevent triggering on the smaller pulses 23.

In this embodiment the last pulse 24 reflected by the delay line, as a negative pulse, is converted to a positive pulse and it alone triggers the amplifier 20 causing an output pulse 28 in response to this last pulse of the train. Thus in this specific illustrative embodiment the last pulse only is selected for transmission to additional circuitry.

Figure 5:
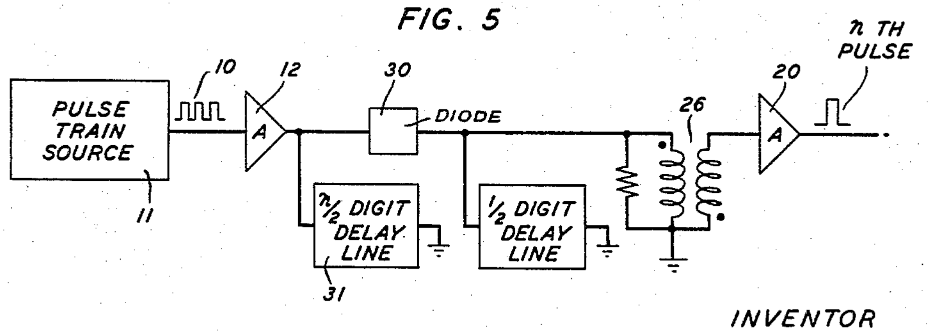
Fig. 5 is a circuit representation, in block diagram form, of another specific illustrative embodiment of this invention whereby a particular pulse, other than the first or last pulse, is selected.

This invention is of course not limited to the selection of only one pulse or of only a first or last pulse. In accordance with the principles of this invention either a given number of pulses may be selected for transmission to additional circuitry or a particular pulse other than the first or last pulse may be selected. This is illustrated in Fig. 5 wherein is depicted a specific illustrative embodiment of this invention by which the $n$th pulse of a train of pulses 10 may be selected.

Turning now to that figure, the pulse train 10 is applied from a pulse train source 11 to the driving amplifier 12 which is connected by an interposed conducting path both to a diode or other unidirectional current element biased to allow passage of pulses of only one polarity, and to a delay line 31 which is terminated in a short circuit. Delay line 31 has a delay of $n/2$ digits so that $n$ digits will have been passed through diode 30 before the first pulse is reflected back by the delay line to its input. The pulses following the first $n$ pulses will therefore be eliminated by the interaction with the reflected pulses, as described further above. This portion of the circuit therefore serves to select the first $n$ pulses of the train of pulses 10. By applying the train of $n$ pulses thus selected to a circuit in accordance with this invention which can select the last pulse of the train, as described above, the $n$th pulse only will be transmitted by the output amplifier 20 and appear as the sole output of the circuit.

Reference is made to my application Serial No. 379,452, filed September 10, 1953, now Patent 2,760,089, issued August 21, 1956, wherein a related invention is disclosed.

It is to be understood that the above-described arrangements are illustrative of the application of the principles of the invention. Numerous other arrangements may be devised by those skilled in the art without departing from the spirit and scope of the invention.

What is claimed is:

1. An electrical circuit for selecting predetermined pulses from a train of pulses comprising a conducting path, means for applying a train of pulses to said path at one-digit intervals, an output element connected to said path, and means for selecting one of said pulses from said train, said last-mentioned means including delay means connected to said path for effecting substantial cancellation of certain of said pulses, said delay means having a delay of an integral number of half digits and being terminated to return said pulses to said path with opposite polarity to said pulses applied thereto, pulse inversion means connected between said pulse source and said output element, and another delay means connected to said conducting path, said another delay means having a delay of an integral number of half digits.

2. An electrical pulse selecting circuit comprising a conducting path, means for applying a train of pulses at one-digit intervals to said path, output means connected to said path, and means for selecting a pulse from said train of pulses, said last-mentioned means including means for receiving pulses from said path and for returning said pulses to said path with opposite polarity after a delay of a predetermined integral number of digits, diode means intermediate said delay means and said output means, and another means for receiving pulses from said path and for returning said pulses to said path after a delay, the delay of said last-mentioned means being one-half digit.

3. An electrical circuit for selecting one or more pulses from a pulse train comprising a pulse transmission path, delay means connected to said path, said delay means being terminated at the end opposite its connection to said path so as to reflect an inverted signal from said termination, means for applying to said transmission path a train of pulses having a pulse period which is a submultiple of the two-way delay of said delay means, unilateral signal responsive means connected to said transmission path, and other delay means connected to said transmission path, said other delay means having a two-way delay equal to said pulse period.

4. An electrical circuit for selecting predetermined terminal pulses from pulse trains comprising a pulse transmission path, means for applying to said transmission path a train of pulses at one-digit intervals, delay means exhibiting a two-way delay equal to an integral number of input pulse digit intervals connected at one end to said transmission path with the other end terminating in a short circuit to reflect pulses applied thereto back to said path with the opposite polarity to effect substantial cancellation of certain of said pulses, unilateral conducting means connected to said path, and pulse inverting means connected in said path between said delay means and said unilateral conducting means.

References Cited in the file of this patent

UNITED STATES PATENTS

| | | |
|---|---|---|
| 2,221,666 | Wilson | Nov. 12, 1940 |
| 2,255,839 | Wilson | Sept. 16, 1941 |
| 2,444,438 | Grieg | July 6, 1948 |
| 2,522,609 | Gloess | Sept. 19, 1950 |
| 2,543,431 | Bess | Feb. 27, 1951 |
| 2,546,371 | Peterson | Mar. 27, 1951 |
| 2,579,497 | Ibister | Dec. 25, 1951 |
| 2,631,232 | Baracket | Mar. 10, 1953 |
| 2,665,413 | Hyman | Jan. 5, 1954 |
| 2,677,760 | Bess | May 4, 1954 |
| 2,679,040 | Gloess | May 18, 1954 |
| 2,706,810 | Jacobsen | Apr. 19, 1955 |
| 2,707,751 | Hance | May 3, 1955 |
| 2,784,310 | Cowan | Mar. 5, 1957 |
| 2,824,958 | Dunn | Feb. 25, 1958 |

OTHER REFERENCES

Abstract Ser. No. 778,969 published March 28, 1950.